(12) United States Patent
Gu

(10) Patent No.: US 11,667,015 B2
(45) Date of Patent: Jun. 6, 2023

(54) CLIPLESS BICYCLE PEDAL AUXILIARY TOOL

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 271 days.

(21) Appl. No.: 17/165,840

(22) Filed: Feb. 2, 2021

(65) Prior Publication Data

US 2022/0241944 A1 Aug. 4, 2022

(51) Int. Cl.
*B25B 27/00* (2006.01)
*B62M 3/08* (2006.01)
*B25B 9/02* (2006.01)

(52) U.S. Cl.
CPC ............ *B25B 27/0071* (2013.01); *B25B 9/02* (2013.01); *B62M 3/08* (2013.01)

(58) Field of Classification Search
None
See application file for complete search history.

(56) References Cited

U.S. PATENT DOCUMENTS

| 2,314,884 | A | * | 3/1943 | Klein | H01R 4/203 403/275 |
| 3,540,106 | A | * | 11/1970 | Goldman | B25B 7/16 29/268 |
| 4,563,833 | A | * | 1/1986 | Aucoin | B25F 1/003 7/128 |
| 7,055,413 | B1 | * | 6/2006 | Wang | B25B 7/04 29/229 |

FOREIGN PATENT DOCUMENTS

CN 204382193 U * 6/2015
WO WO-9316580 A1 * 8/1993 ............. B25B 31/00

OTHER PUBLICATIONS

English Translation of CN-204382193 (Year: 2015).*

* cited by examiner

*Primary Examiner* — Brian D Keller

(57) ABSTRACT

A clipless bicycle pedal auxiliary tool includes two cramp bodies, each cramp body includes a pivot part, a holding section and a clamping section, the two pivot parts are pivoted with each other, and the holding sections and the clamping sections are disposed on two sides of the pivot parts, respectively. Each clamping section includes a clamping pin and a pushing pin protruded thereon. The two holding sections can be operated to pivotally swing the two clamping section relative to each other, and make the two clamping pins and the two pushing pins move close to and away from each other, so that the two clamping pins can clamp the two inner sides of the clamping fastener of the clipless bicycle pedal, and the two pushing pins push the two outer sides of the clamping fastener to form a force pivot.

5 Claims, 8 Drawing Sheets

CLIPLESS BICYCLE PEDAL AUXILIARY TOOL

BACKGROUND OF THE INVENTION

1. Field of the Invention

The present invention relates to a technical field of auxiliary detaching structure for an indoor bike pedal, and more particularly to a clipless bicycle pedal auxiliary tool.

2. Description of the Related Art

Indoor bike is actually a kind of indoor exercise apparatus that simulates a bicycle riding exercise, and when real bicycle riding activities cannot be carried out outdoors, this fixed exercise apparatus can be used indoors. Besides providing ordinary people to ride for fitness purposes, the indoor bike can be equipped with clipless bicycle pedals with clamping fasteners, and the clamping fastener can be elastically engaged with an engaging part of a bicycle shoe sole, so as to improve the pedaling efficiency in the riding operation for competition training.

However, the clipless bicycle pedal is a targeted structure for being engaged with the bicycle shoe sole, and it is not suitable for ordinary people wearing ordinary shoe for pedaling use, so the clipless bicycle pedal forms an exclusivity for ordinary people to use. Therefore, related manufacturers have also developed a flat pedal which can be combined with the clipless bicycle pedal, and the flat pedal has engaging parts disposed on two ends thereof and configured to respectively engage and assemble with the clipless bicycle pedals, so as to provide ordinary people wearing ordinary shoes to ride and pedal for fitness purposes.

Because the clamping fastener of the clipless bicycle pedal is designed to elastically engage the bicycle shoe and a rider cam push out the clamping fastener to separate from the bicycle shoe by the force of the rider's lower leg. However, when a user wants to separate the flat pedal engaged with the clipless bicycle pedal by hand, the force applied by wrist to grasp the clipless bicycle pedal is far lower than the force applied by the lower leg to push the clipless bicycle pedal out, and the force applied by wrist is not enough to resist the elastic force of clamping fastener clamping the flat pedal, the user may fail to separate the flat pedal from the clipless bicycle pedal.

Therefore, how to design an auxiliary tool to assist the user to quickly separate the flat pedal from the clipless bicycle pedal is the problem to be solved in the present invention.

SUMMARY OF THE INVENTION

An objective of the present invention is to provide an auxiliary tool to assist a user to quickly separate a flat pedal from a clipless bicycle pedal.

In order to achieve the aforementioned objective and effect, the present invention provides a clipless bicycle pedal auxiliary tool configured to provide assistance in separating an engaging part of a flat pedal from a clamping faster of a clipless bicycle pedal, and the clipless bicycle pedal auxiliary tool includes two cramp bodies, and each of the two cramp bodies includes a pivot part, a holding section and a clamping section, and the pivot parts of the two cramp bodies are pivoted with each other, and the two holding sections and the two clamping sections of the two cramp bodies are disposed on two sides of the pivot parts, and each of the two clamping sections includes a clamping pin and a pushing pin protruded thereon, the clamping pins of the two clamping sections are extended toward each other, and the two pushing pins of the two clamping sections are extended toward each other.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
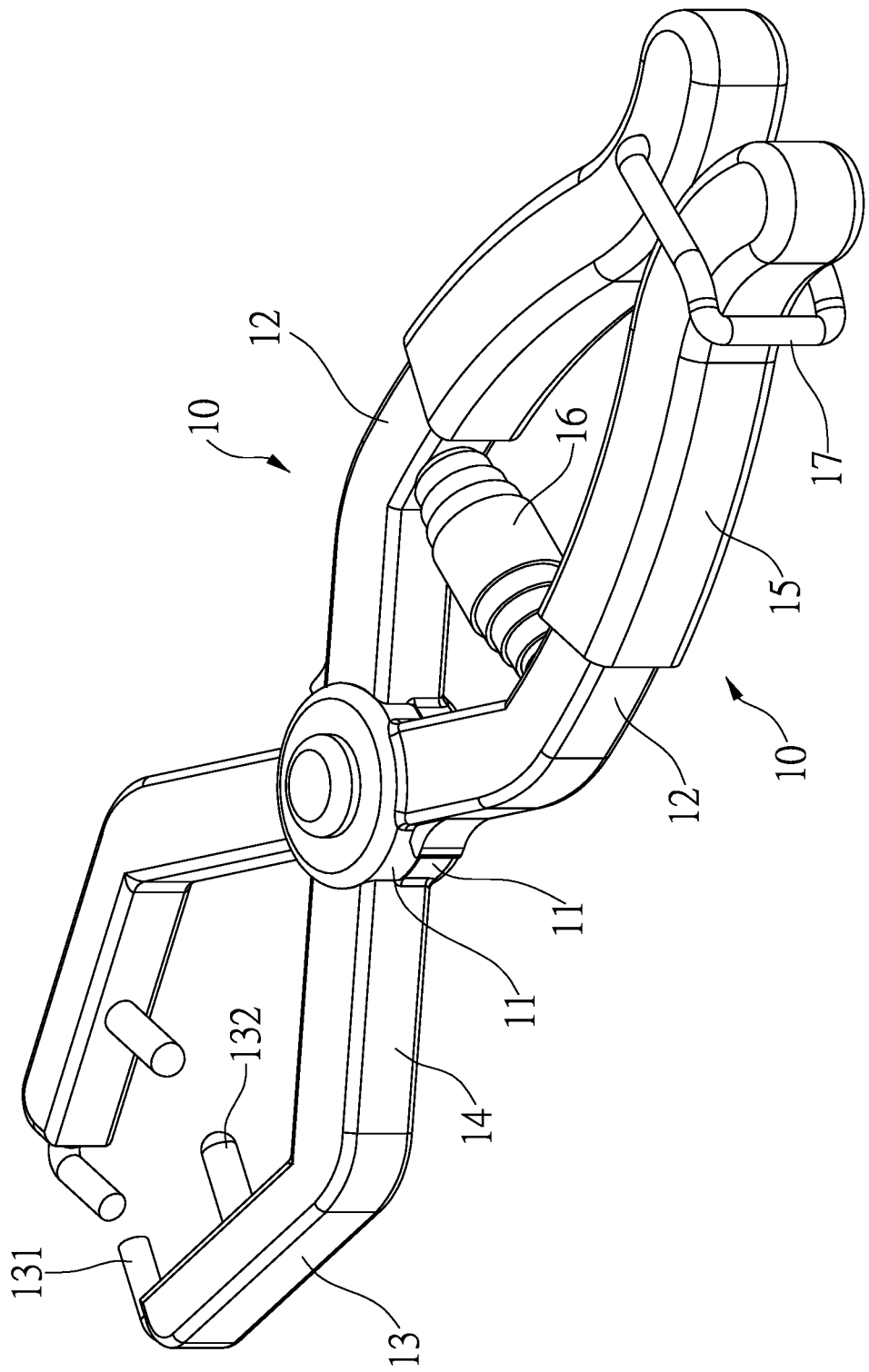
FIG. 1 is a perspective view of a clipless bicycle pedal auxiliary tool of the present invention in a closed status.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 8. As shown in FIGS. 1 to 8, the present invention discloses a clipless bicycle pedal auxiliary tool which provides assistance in separating an engaging part 31 of a flat pedal 30 from a clamping fastener 21 of a clipless bicycle pedal 20, and the clipless bicycle pedal auxiliary tool includes two cramp bodies 10.

Figure 2:
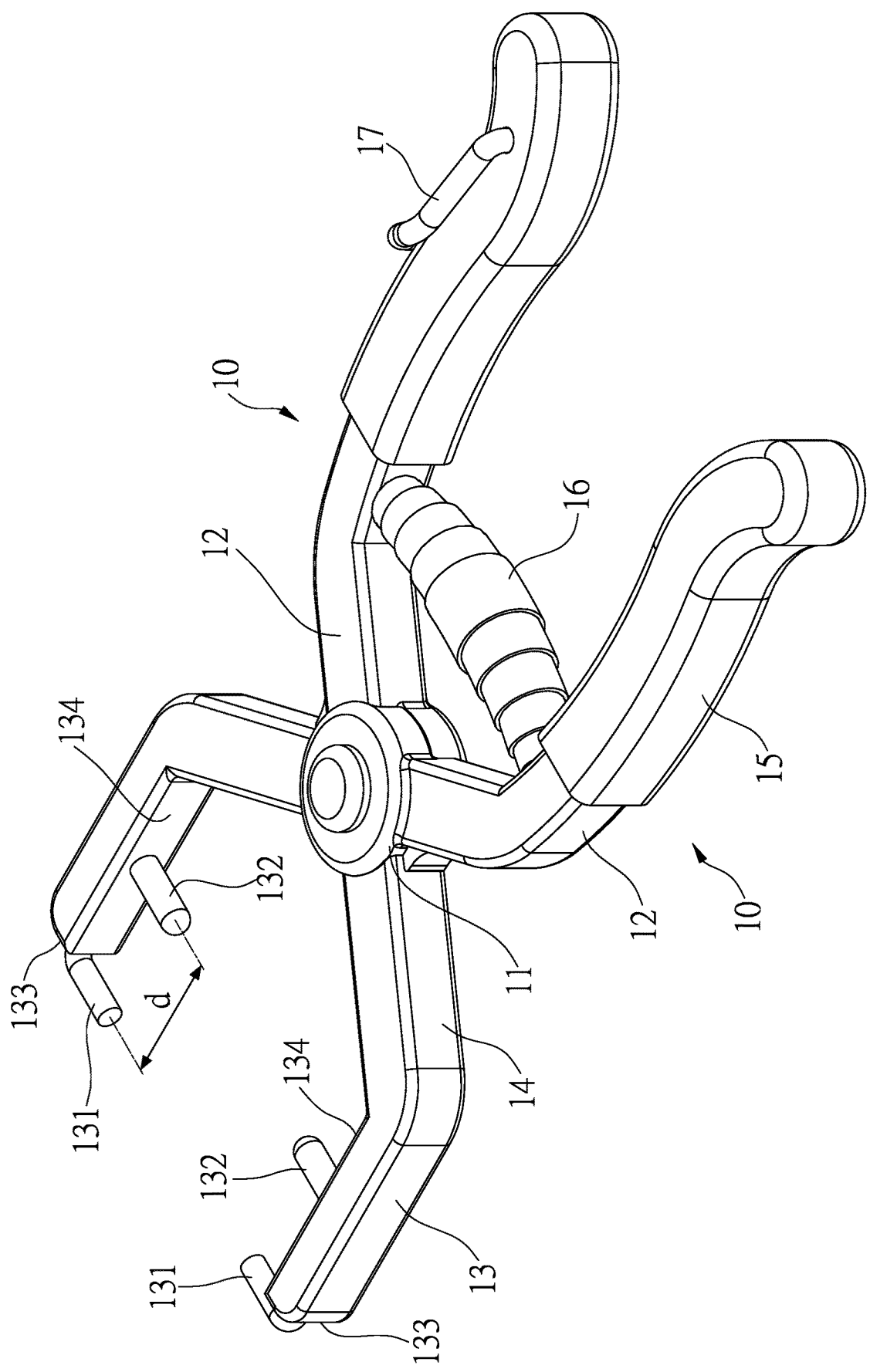
FIG. 2 is a perspective view of a clipless bicycle pedal auxiliary tool of the present invention in an open status.
Figure 3:
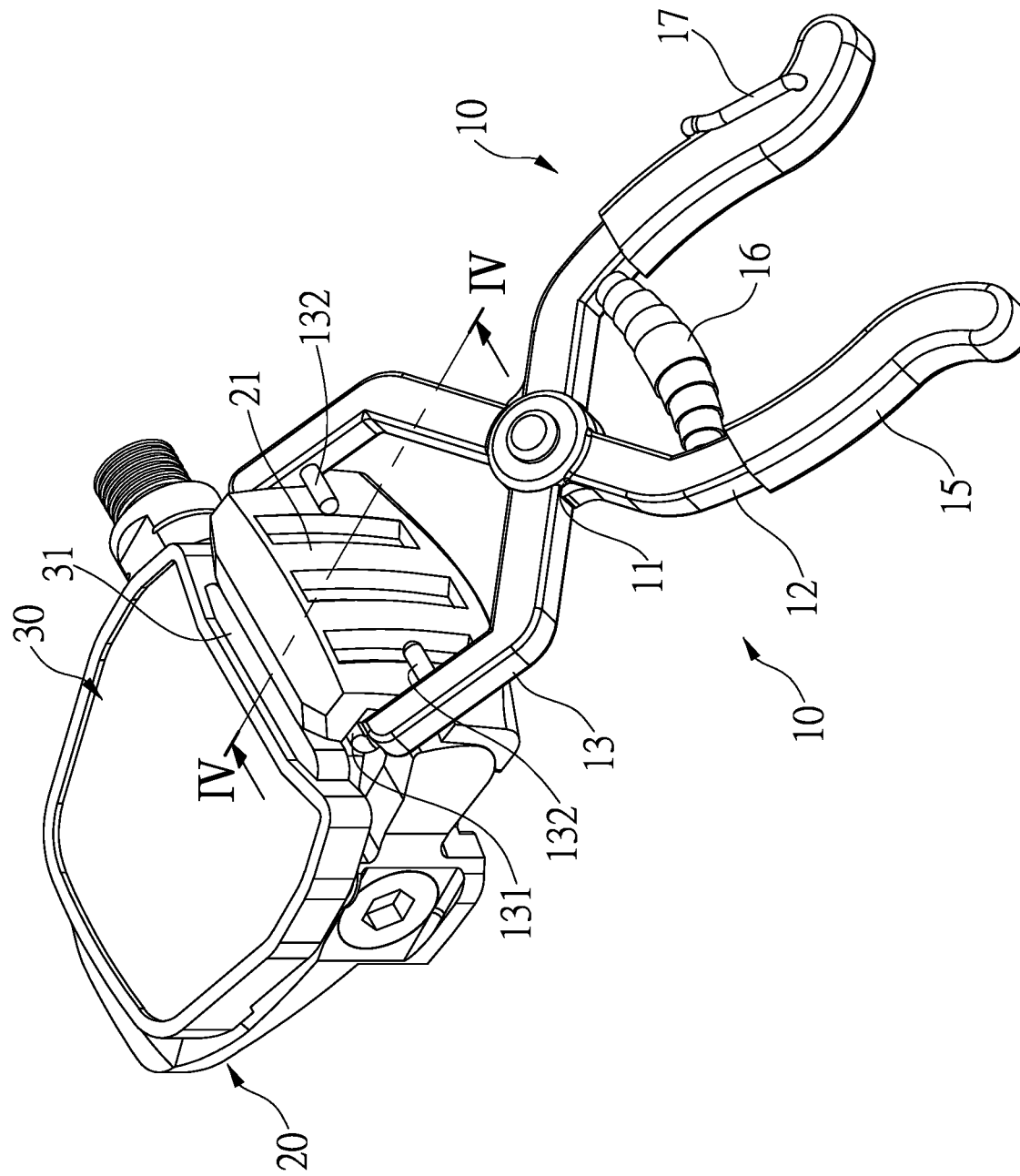
FIG. 3 is a perspective view showing an operation of separating a flat pedal from a clipless bicycle pedal, according to the present invention.
Figure 4:
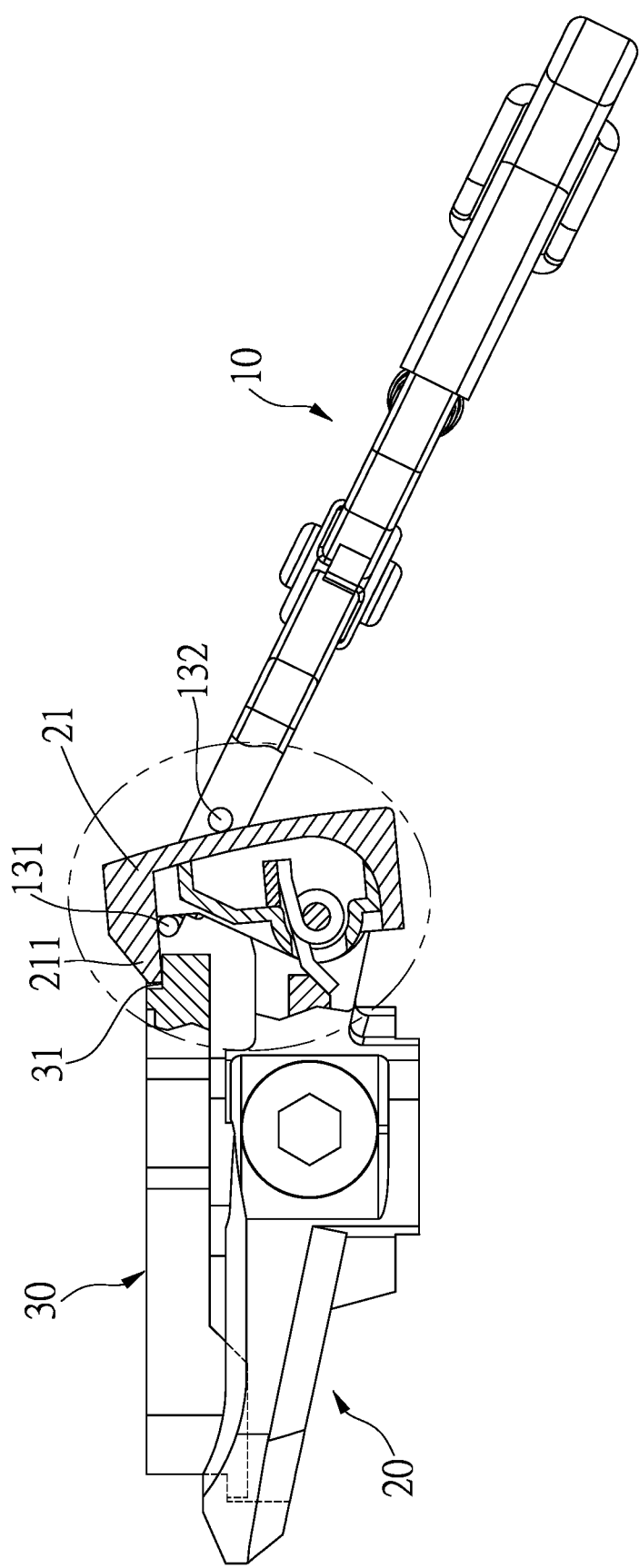
FIG. 4 is a schematic cross-sectional view taken along IV-IV of FIG. 3.
Figure 5:
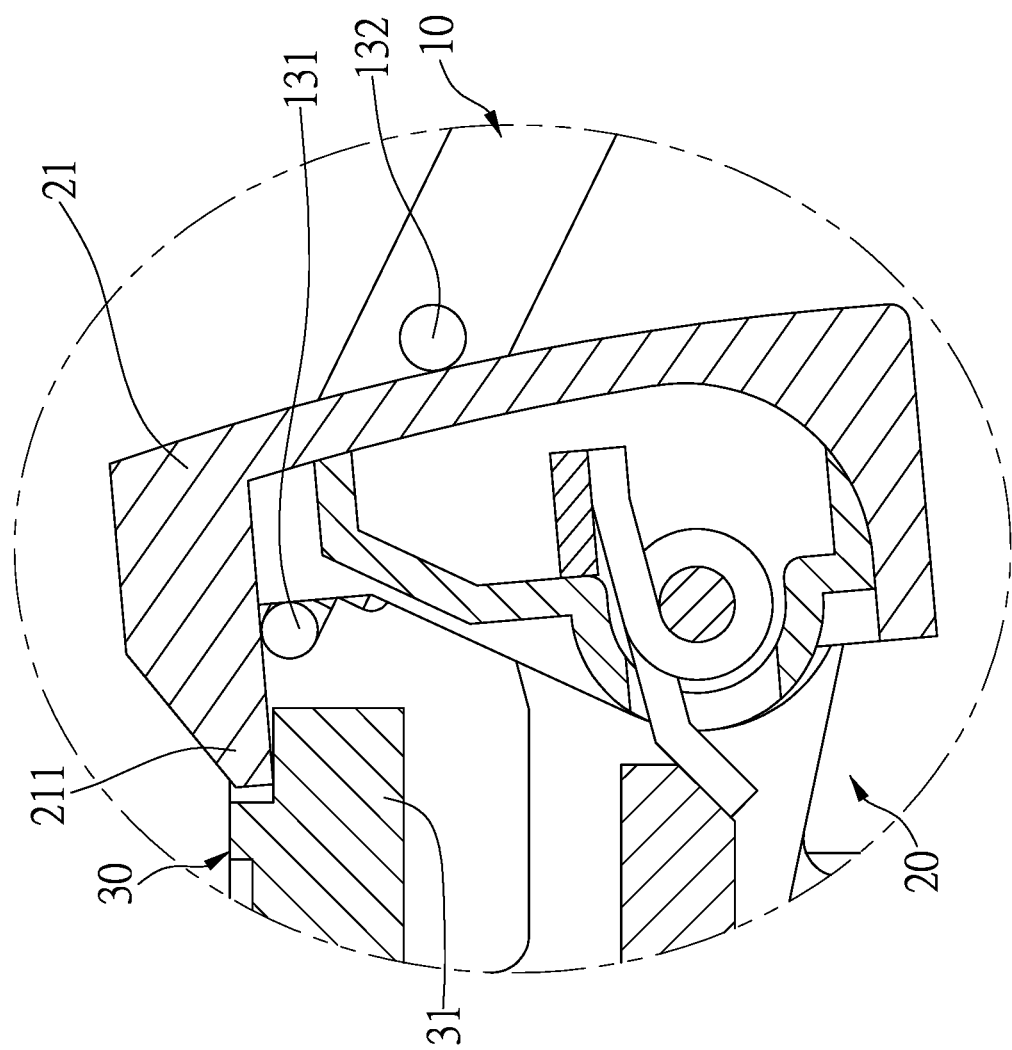
FIG. 5 is an enlarged schematic cross-sectional view of a part of FIG. 4.
Figure 6:
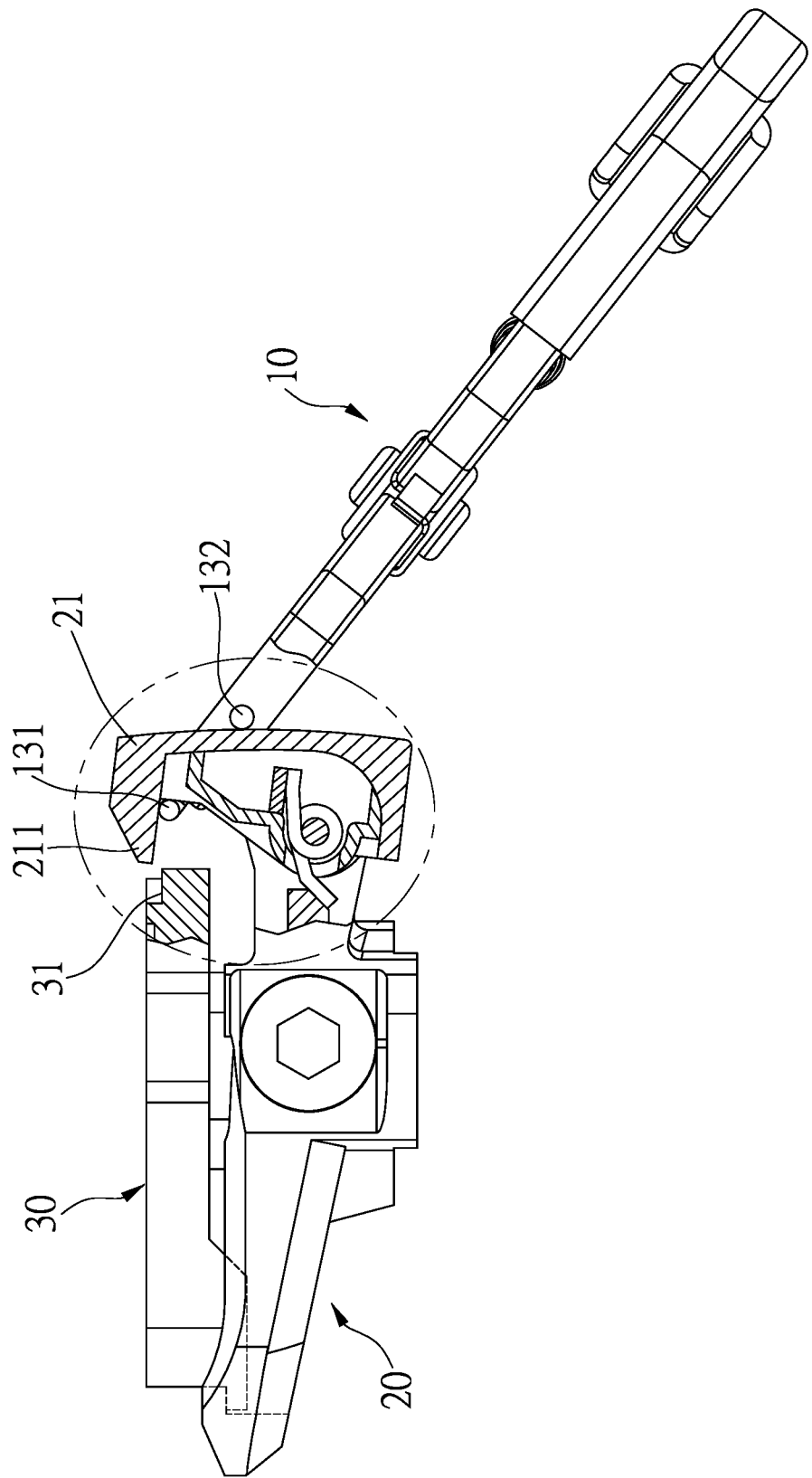
FIG. 6 is a schematic cross-sectional view showing an operation of opening the clamping fastener of FIG. 4.
Figure 7:
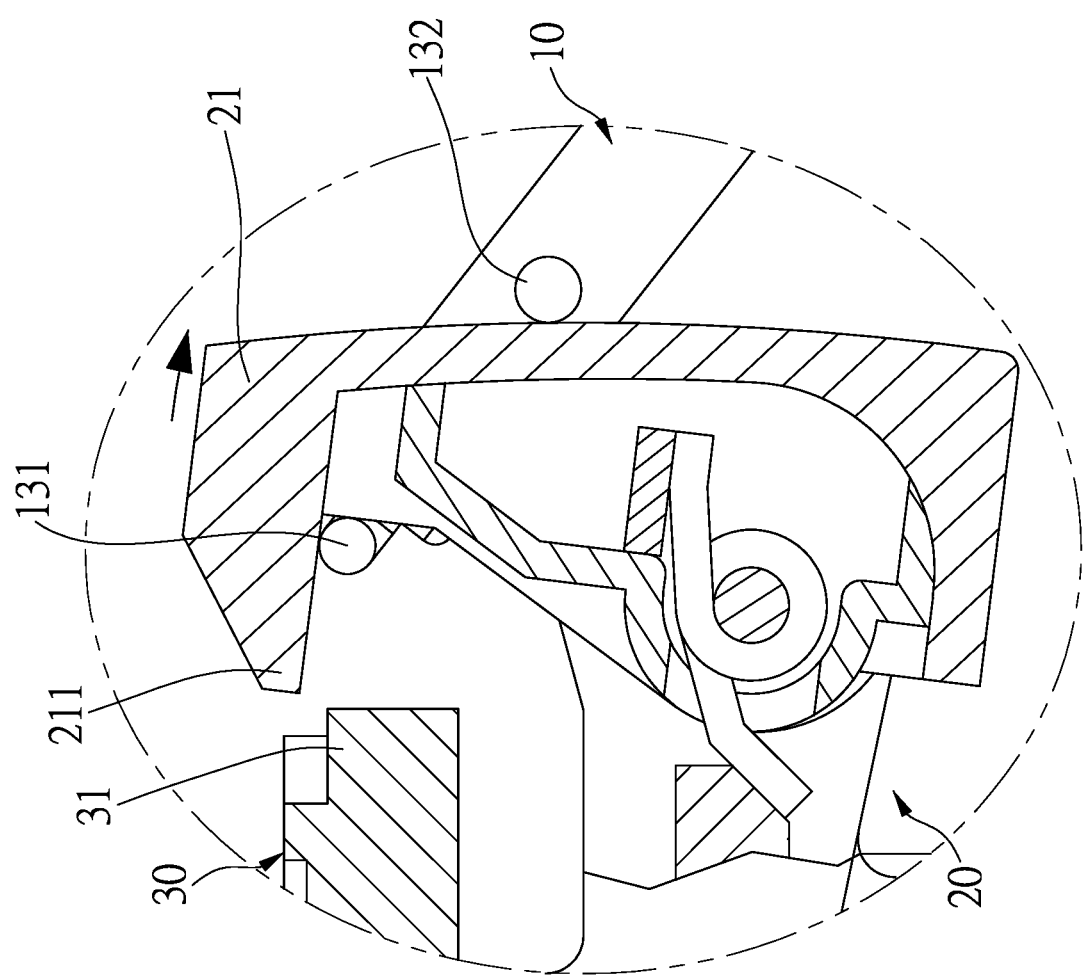
FIG. 7 is an enlarged schematic cross-sectional view of a part of FIG. 6.
Figure 8:
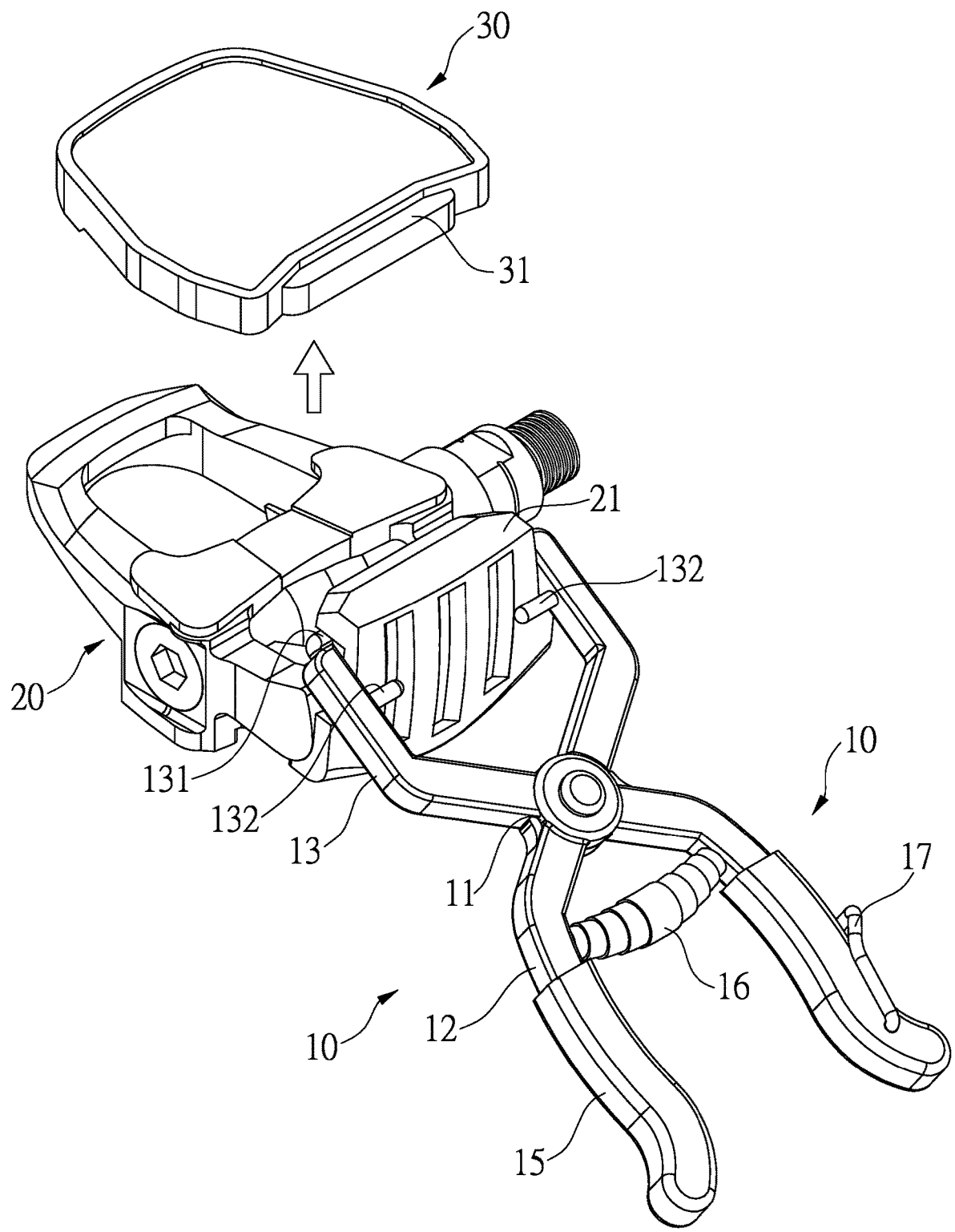
FIG. 8 is a perspective view of a flat pedal completely separated from a clipless bicycle pedal, according to the present invention.

Each cramp body 10 includes a pivot part 11, a holding section 12 and a clamping section 13, and the pivot parts 11 of the two cramp bodies 10 are pivoted with each other, and the two holding sections 12 and the two clamping sections 13 of the two cramp bodies 10 are disposed on two sides of the pivot parts 11, and each of the two clamping section 13 includes a clamping pin 131 and a pushing pin 132 protruded thereon, and the clamping pins 131 of the two clamping sections 13 are extended toward each other, and the two pushing pins 132 of the two clamping sections 13 are extended toward each other. As shown in FIG. 2, the two clamping pins 131 and two pushing pins 132 are respectively protruded and extended toward each other when the clipless bicycle pedal auxiliary tool of the present invention is in an open status. The two holding sections 12 are pivotally swingable to make the two clamping sections 13, the two clamping pins 131 and two pushing pins 132 move close to or away from each other, so as to perform engagement releasing operation.

According to aforementioned content, the clamping pins 131 of the two clamping sections 13 of the two cramp bodies 10 are extended toward each other, and the two pushing pins 132 of the two clamping sections 13 of the two cramp bodies 10 are extended toward each other, and a distance d between the pushing pin 132 and the clamping pin 131 is greater than a thickness of a part, which is near a hook part 211, of the clamping fastener 21, as shown in FIGS. 4 to 8. Therefore, in the engagement releasing operation, the clamping pin 131 and the pushing pin 132 can be located in an inner side and an outer side of the clamping fastener 21, and when the two clamping pins 131 are used to clamp the two inner sides of the clamping fastener 21 of the clipless bicycle pedal 20, the two pushing pins 132 can push the two outer sides of the clamping fastener 21 to form a force pivot, and the extension of the two holding section 12 can form a longer arm of force for effort saving. In the condition that the clipless bicycle pedal 20 is fastened, a user can apply force on the holding sections 12 to make the two clamping pins 131 push the clamping fastener 21 to loosen in a direction (such as an arrowhead direction shown in FIG. 7) opposite to the clamping direction of the hook part 211, so that the flat pedal 30 can be released easily to quickly separate from the clipless bicycle pedal 20.

The features of components of the clipless bicycle pedal auxiliary tool of the present invention are illustrated in detail in following paragraphs. As shown in FIGS. 1 to 8, each cramp body 10 includes a cross section 14 connected to the holding section 12 and the clamping section 13, and the pivot part 11 is disposed on a middle section of the cross section 14. As shown in FIG. 2, each clamping section 13 includes an outer end surface 133 and an inner side surface 134, and the two pushing pins 132 are disposed on the inner side surfaces 134 of the two clamping sections 13, respectively, and the two clamping pins 131 are protruded on the two outer end surfaces 133 of the two clamping sections 13, respectively. In engagement releasing operation, the two clamping pins 131 protruded on the outer end surfaces 133 of the two clamping sections 13 can be easily inserted between the flat pedal 30 and the clamping fastener 21 of the clipless bicycle pedal 20, so as to quickly clamp the clamping fastener 21 without being interfered.

In an embodiment, the clipless bicycle pedal auxiliary tool 10 further includes two non-slip holding sleeves 15 mounted on two holding sections 12, respectively. The non-slip performance of the two non-slip holding sleeves 15 can effectively improve the operational effect in use.

In an embodiment, the clipless bicycle pedal auxiliary tool 10 further includes an external tension spring 16 having two ends abutted with the two opposite sides of the two holding sections 12. The external tension spring 16 is disposed between the two non-slip holding sleeves 14 and the pivot parts 11. The external tension spring 16 is used to assist the two holding sections 12 to form a normally-open status, as shown in FIG. 2, so that the user can directly insert the clamping pins 131 into the positions of clamping operation without applying an external tension operation, so as to further improve the operational efficiency in use.

In an embodiment, the clipless bicycle pedal auxiliary tool 10 further includes a movable restraining frame 17 pivoted on one of the two holding sections 12. When the other of the two holding sections 12 is pivotally swung close to the one of the two holding sections 12, the movable restraining frame 17 can be swung to mount and fasten the other of the two holding sections 12, so as to restrain the two holding sections 12 in a closed status, as shown in FIG. 1. The movable restraining frame 17 can be used to restrain and fasten the auxiliary tool in the closed status, so that the occupying space of the auxiliary tool can be reduced and the auxiliary tool is easy to carry and use.

According to above-mentioned contents, the two cramp bodies 10 includes two holding sections 12 and two clamping sections 13 disposed on two sides of the pivot parts 11, respectively, and the two clamping sections 13 includes the two clamping pins 131 and the two pushing pins 132 protruded thereon, and the two clamping pins 131 are extended to each other, and the two pushing pins 132 are extended to each other, the distance d between the clamping pin 132 and the pushing pin 131 is greater than the thickness of the part, which is near the hook part 211, of the clamping fastener 21, and when the two clamping pins 131 are used to clamp the two inner sides of the clamping fastener 21 of the clipless bicycle pedal 20, the two pushing pins 132 can push the two outer sides of the clamping fastener 21 to form the force pivot, so as to solve the problem that the force applied by wrist to grasp the clipless bicycle pedal is not enough to resist the elastic clamping force of the clamping fastener and fails to separate the flat pedal from the clipless bicycle pedal. The clipless bicycle pedal auxiliary tool of the present invention has following advantages.

First, the extension of the two holding sections 12 can form a longer arm of force for effort saving. A user can apply force on the holding sections 12 to make the two clamping pins 131 push the clamping fastener 21 to loosen in a direction opposite to the clamping direction, to resist the elastic clamping force of the clamping fastener 21, so that the clamping fastener 21 engaged with the clamp part 31 of the flat pedal 30 can be released by a larger torque.

Secondly, the flat pedal 30 can be easily released to quickly separate from the clipless bicycle pedal 20.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A clipless bicycle pedal auxiliary tool to separate an clamping fastener of a clipless bicycle pedal from an engaging part of a flat pedal, comprising:

two cramp bodies, wherein each of the two cramp bodies comprises a pivot part, a holding section and a clamping section, and the pivot parts of the two cramp bodies are pivoted with each other, and the two holding sections and the two clamping sections of the two cramp bodies are disposed on two sides of the pivot parts, and each of the two clamping sections comprises a clamping pin and a pushing pin protruded thereon, the clamping pins of the two clamping sections are extended toward each other, and the two pushing pins of the two clamping sections are extended toward each other, each of the two clamping sections comprising an outer end surface and an inner side surface, the outer end surface and the inner side surface being located on two different planes and extending toward different directions, the inner side surface located closer to the pivot part than the outer end surface, the two pushing pins disposed on the inner side surfaces of the two clamping section respectively, the two clamping pins protruded on the two outer end surfaces of the two clamping sections respectively, a distance between the pushing pin and the clamping pin of each clamping section being greater than a thickness of a portion of the clamping fastener that is close to a hook part of the clamping fastener;

a space being formed between the engaging part of the flat pedal and an underside of the hook part of the clamping fastener when the engaging part of the flat pedal is engaged with the clamping fastener of the clipless bicycle pedal, and the clamping pins inserted into the space from outside of the clipless bicycle pedal and contacting an inside of the clamping fastener, the pushing pins contacting an outside of the clamping fastener, when pivoting the clipless bicycle pedal auxiliary tool about the pushing pins, the clamping fastener is pivoted and separated from the engaging part of the flat pedal to remove the flat pedal from the clipless bicycle pedal.

2. The clipless bicycle pedal auxiliary tool according to claim 1, wherein each of the two cramp bodies comprises a cross section connected to the holding section and the clamping section, and the pivot part is disposed on a middle section of the cross section.

3. The clipless bicycle pedal auxiliary tool according to claim 1, further comprising two non-slip holding sleeves mounted on two holding sections, respectively.

4. The clipless bicycle pedal auxiliary tool according to claim 3, further comprising an external tension spring having two ends abutted with the two opposite sides of the two holding sections, wherein the external tension spring is disposed between the two non-slip holding sleeves and the pivot parts.

5. The clipless bicycle pedal auxiliary tool according to claim 1, further comprising a movable restraining frame pivoted on one of the two holding sections, wherein when the other of the two holding sections is pivotally swung close to the one of the two holding section, the movable restraining frame is configured to swing to mount and fasten the other of the two holding sections, so as to restrain the two holding sections in a closed status.

* * * * *